United States Patent [19]

Sakai et al.

[11] Patent Number: 5,098,518

[45] Date of Patent: Mar. 24, 1992

[54] THIN FILM DOWN FLOW TYPE CONCENTRATOR

[75] Inventors: Yoshiharu Sakai, Ikoma; Kenzo Masutani, Osaka, both of Japan

[73] Assignee: Hisaka Works Limited, Osaka, Japan

[21] Appl. No.: 415,201

[22] PCT Filed: Feb. 13, 1989

[86] PCT No.: PCT/JP89/00144

§ 371 Date: Sep. 1, 1989

§ 102(e) Date: Sep. 1, 1989

[87] PCT Pub. No.: WO90/09220

PCT Pub. Date: Sep. 23, 1990

[51] Int. Cl.$^5$ ............................ B01D 1/22; B01D 1/26
[52] U.S. Cl. ............................ 159/13.1; 159/17.1; 159/28.6; 165/167; 202/236
[58] Field of Search ............ 159/28.6, 17.1, 13.1, 159/46, 49; 165/166, 167; 202/236

[56] References Cited

U.S. PATENT DOCUMENTS

| | | | |
|---|---|---|---|
| 2,960,160 | 11/1960 | Goodman | 159/28.6 |
| 3,735,793 | 5/1973 | Burberry et al. | 159/28.6 |
| 4,572,766 | 2/1986 | Dimitriou | 159/28.6 |

FOREIGN PATENT DOCUMENTS

| | | | |
|---|---|---|---|
| 880591 | 6/1953 | Fed. Rep. of Germany | 159/28.6 |
| 2030397 | 1/1971 | Fed. Rep. of Germany | 165/166 |
| 31-8682 | 6/1956 | Japan . | |
| 49-42658 | 11/1974 | Japan . | |
| 60-48202 | 10/1985 | Japan . | |
| 62-22990 | 1/1987 | Japan . | |
| 788193 | 12/1957 | United Kingdom | 159/28.6 |

Primary Examiner—Wilbur Bascomb, Jr.
Attorney, Agent, or Firm—Armstrong, Nikaido, Marmelstein, Kubovcik & Murray

[57] ABSTRACT

A thin film downward flow type plate concentrator suitable for concentration of liquids which are highly heat-sensitive, wherein preheating channels (19), distributing portions (23), pool portions (24) and heating channels (18) which are formed in heat transfer plates (10) are improved to provide efficient concentration of a raw liquid in one-pass. These various portions are given respective channel shapes most suitable for their respective roles with respect to the raw liquid; thus, the total heat transfer performance is improved.

7 Claims, 8 Drawing Sheets

THIN FILM DOWN FLOW TYPE CONCENTRATOR

TECHNICAL FIELD

This invention relates to a thin film down flow type concentrator suitable for use for concentration of highly heat-sensitive liquids, for example, various fruit juices, extracts of vegetables, herbs and other agricultural products, extracts of domestic animal bones, extracts of crabs, shrimps, shellfishes, fishes, seaweeds and other marine products, dairy products and fermented products.

BACKGROUND ART

To concentrate a highly heat-sensitive liquid, it is necessary to effect concentration in a thermal contact state at low temperature and in a short period of time. To this end, it is required that a raw liquid supplied to a concentrator be withdrawn in one pass as a concentrate. In the case of withdrawal in one pass, the amount of liquid decreases with concentration; thus, how to uniformly distribute this decreasing liquid over a heat transfer surface is an important point. Heretofore, a concentrator which is a long-tube version of the heat transfer tube system has been used. With this system, however, a uniform distribution of raw liquid over a heat transfer surface can hardly be attained; for example, there has been a drawback that the flow of raw liquid deviates to one side of the heat transfer tube, considerably decreasing the heat transfer efficiency. Another drawback is that cleaning is not easy.

A concentrator based on the heat transfer plate system is also known. In this system also, the distribution of raw liquid is insufficient and the plate is short in length for its width; therefore, in the case where the amount of liquid is small, the plate surface dries, resulting in the scorching of the raw liquid, leading to a deterioration in quality.

To remedy the above drawbacks, we have proposed the following.

We have proposed an apparatus which operates on the principle of forming a preheating channel along the longitudinal center line of a heat transfer plate in which a raw liquid ascends, while forming heating channels on both sides of said preheating channel in which the raw liquid flows down in thin film form, preheating the raw liquid while the latter is ascending, distributing the raw liquid to both sides from the upper end of said preheating channel, and heating the raw liquid during this flow so as to evaporate and separate the moisture, thereby providing a concentrated liquid (see Japanese Patent Application Laid-Open Specification No. 22990/1987, dated Jan. 31, 1987, published by the Japanese Patent Office).

The above proposal is capable of contributing to the remedy of the drawbacks involved in using the conventional concentrator based on the heat transfer plate system, but much remains to be improved in connection with improving the performance in such regions in the heat transfer plate as the preheating channel, distributing region and heating channels.

This invention has been proposed in view of the above problems in the prior art, and an object thereof is to improve the performance in such regions in the heat transfer plate as the preheating channel, distributing region and heating channels.

DISCLOSURE OF THE INVENTION

To achieve said object, this invention, in the preheating channel, uses an arrangement wherein the channel cross-section comprises a repetition of wide and narrow portions, thereby promoting the turbulence of a raw liquid and improving the performance of heat transfer in the preheating process.

Further, in the distributing region, the raw liquid making a U-turn from the upper end of the preheating channel to the heating channels on both sides is fed to the heating channels in such a manner that the liquid film thickness is made uniform. This is attained by forming a plurality of narrow portion forming ridges extending at right angles to the liquid film flow and spaced in the direction of flow of the raw liquid, systematically disposing distributing projections between said narrow portion forming ridges and in an outlet region from a distributing portion, said projections serving for uniform distribution of a raw liquid, forming a recessed pool portion at the terminal end of the distributing portion extending at right angles to the direction of downward flow of the raw liquid and serving to increase the liquid film thickness, said pool portion ensuring that the film thickness of the raw liquid fed to the heating channels is retained uniform at all times throughout the width of the channels.

Further, in the heating channels, a number of longitudinal grooves extend in wave form in the direction of downward flow of the raw liquid at a regular pitch in the direction of the width of the heating channels, said longitudinal grooves serving to guide and control the direction of downward flow of the raw liquid to ensure regular flow, preventing deviation of the raw liquid flow and the drying of the plate surface, ensuring uniform evaporation and gradual decrease of the thickness of the liquid film. Further, the array pitch of said longitudinal grooves and the groove corner curvature have predetermined values. On one heat transfer plate surface associated with the heating steam, the condensate drain is collected in the groove bottom by surface tension, while the raised portions are exposed to prevent deterioration of the film heat transfer performance caused by the film form sticking of condensate drain. On the other heat transfer plate surface associated with the raw liquid, the raw liquid is likewise collected in the groove bottom by surface tension to decrease the thickness of the liquid film on the raised portions, thereby improving the film heat transfer performance. These and other features of the invention will become more apparent from the following description to be given with reference to the accompanying drawings.

BRIEF DESCRIPTION OF THE DRAWINGS

FIG. 6A is an enlargement of the indicated portion of FIG. 6.

BEST MODE OF EMBODYING THE INVENTION

Figure 1A:
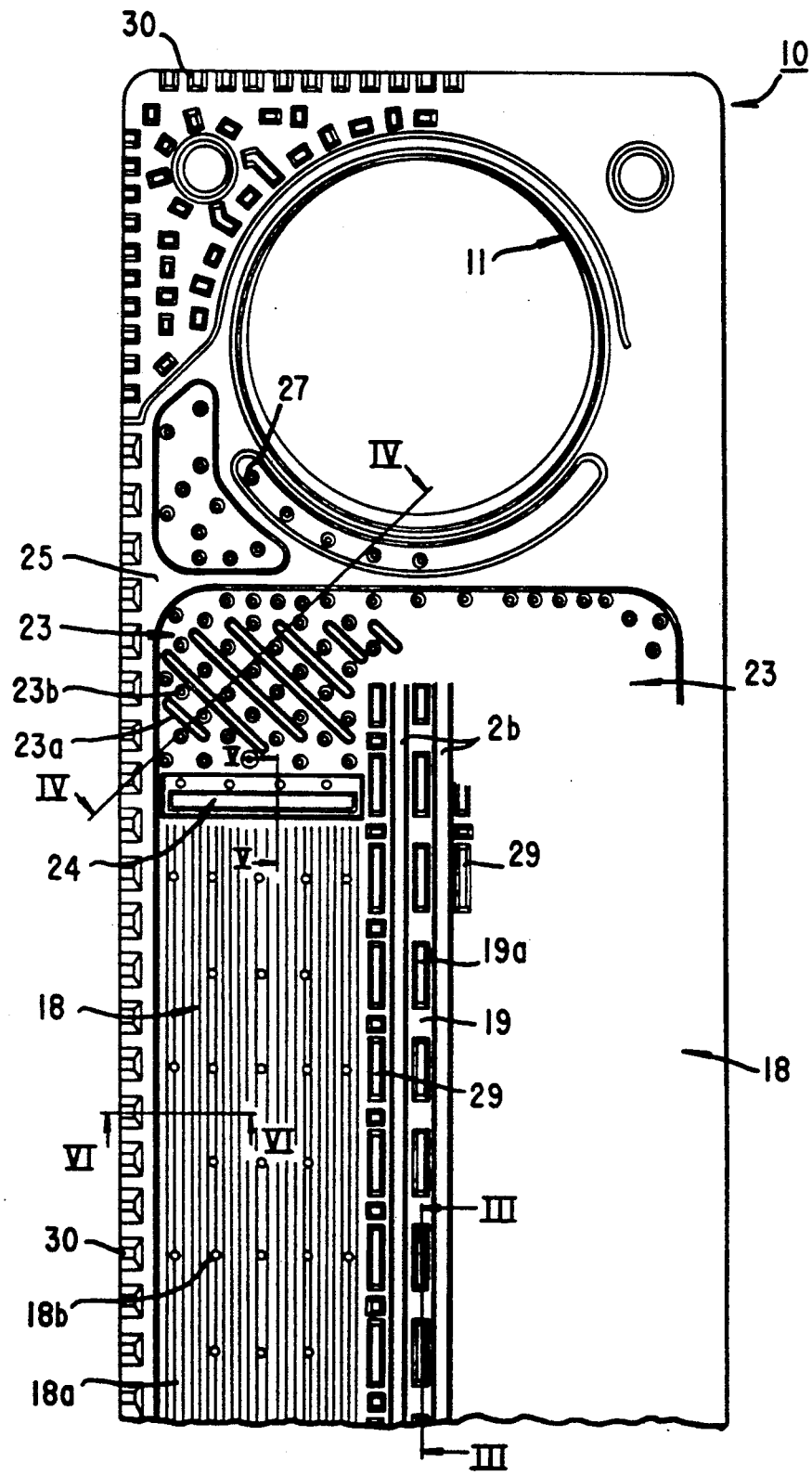
FIG. 1A is an upper plan view of a heat transfer plate according to the present invention and FIG. 1B is a lower plan view, the right-hand side half of the heat transfer plate being omitted from both views since it is symmetrical with the left-hand side half.
Figure 1B:
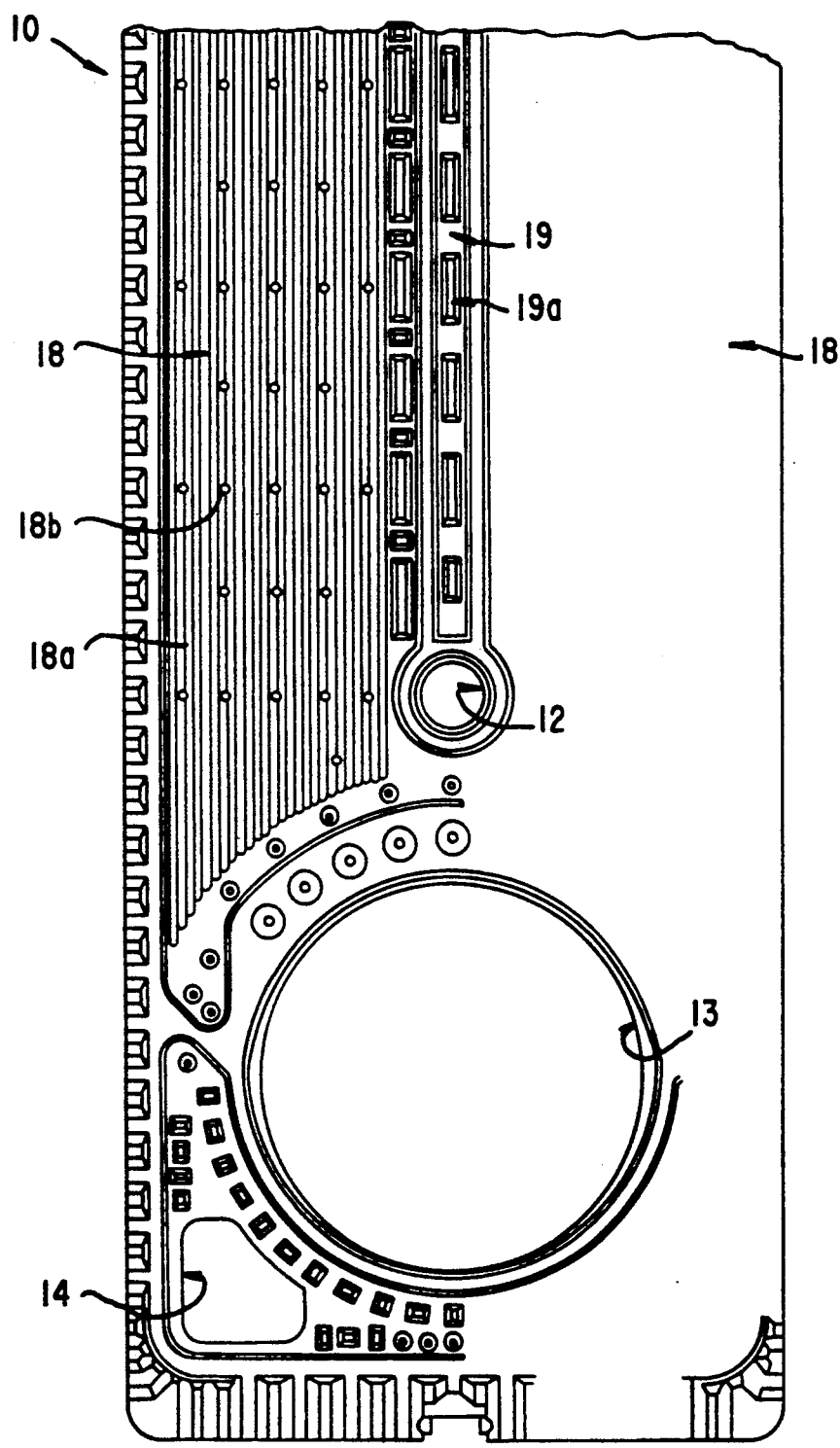

In FIGS. 1A and 1B, the numeral 10 collectively denotes a heat transfer plate according to the present invention, having a heating steam inlet 11 in the upper portion and in the lower portion a raw liquid inlet 12, an outlet 13 for concentrate and separated steam, and a drain outlet 14, the ratio between the length and the width being about 9:1.

Figure 2A:
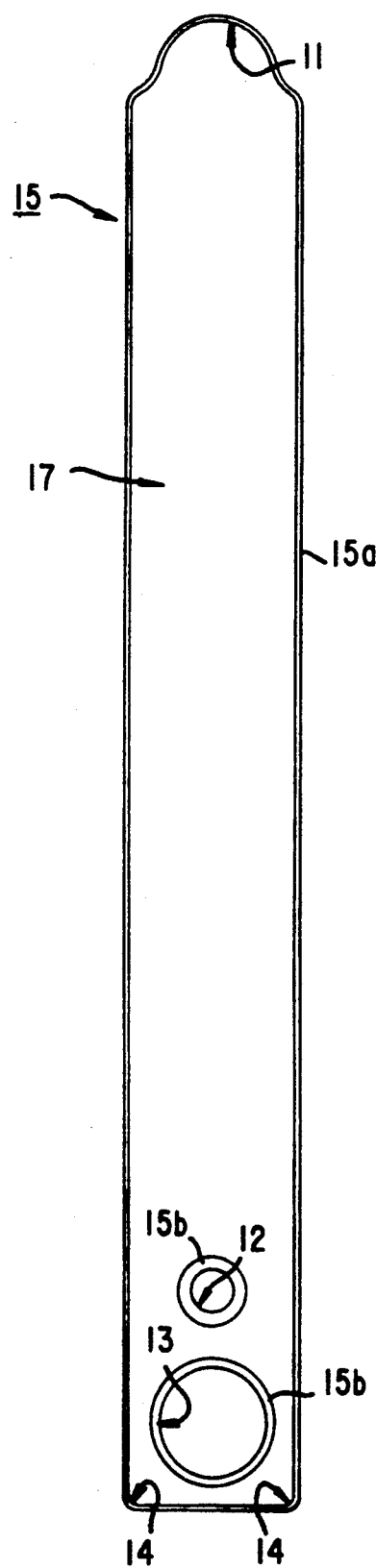
FIG. 2A is a plan view of a heating steam channel forming gasket and FIG. 2B is a plan view of a raw liquid channel forming gasket, the scale used in both views being smaller than in FIGS. 1A and 1B.
Figure 2B:
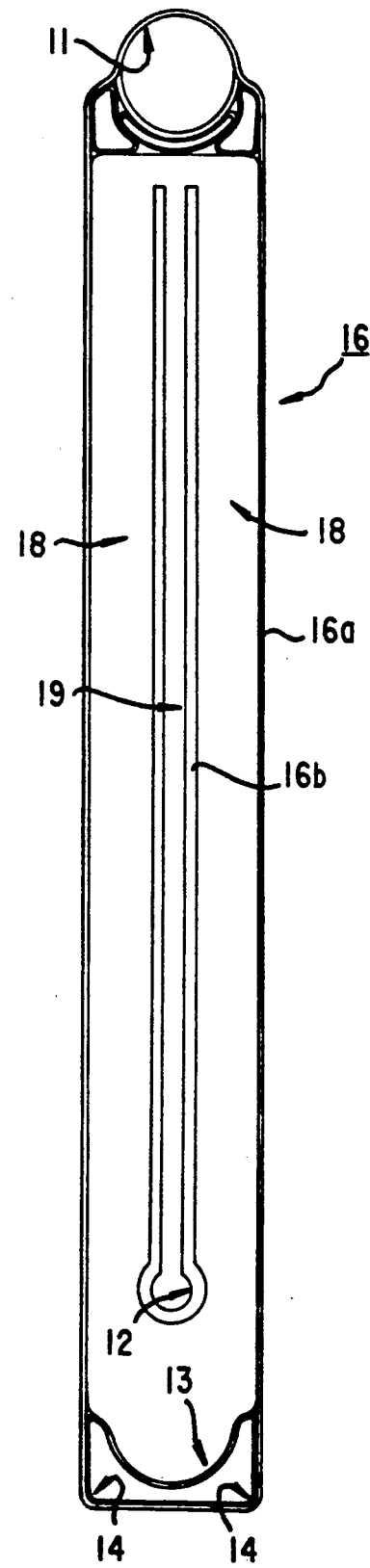
Figure 7:
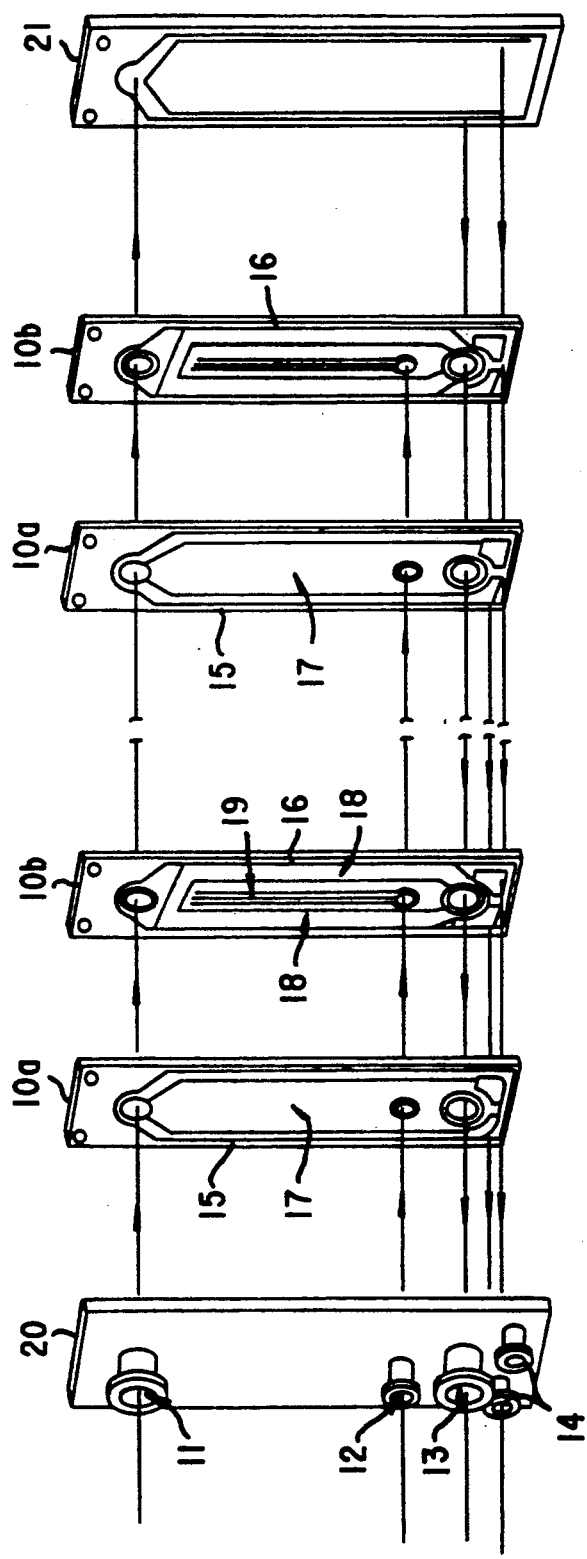
FIG. 7 is an exploded perspective view schematically showing the arrangement of a concentrator using heat transfer plates according to the present invention.

In the heat transfer plate 10, a steam plate 10a shown in FIG. 7 is formed by mounting a heating steam channel forming gasket 15 shown in FIG. 2A. Further, by mounting a raw liquid channel forming gasket 16 shown in FIG. 2B, a raw liquid plate 10b shown in FIG. 7 is formed.

The heating steam channel forming gasket 15 comprises an outer frame 15a surrounding the plate periphery extending from the upper portion of the heating steam inlet 11 to a drain outlet 14 in the upper portion so as to form a heating steam channel 17, and an inner frame 15b surrounding the raw liquid inlet 12 and the outlet 13 for concentrate and separated steam. Therefore, in the heat transfer plate 10a shown in FIG. 7, the heating steam flowing in through the heating steam inlet 11 is condensed as it flows through the heating steam channel 17, becoming the drain which is discharged through the drain outlet 14, so that the raw liquid and the concentrate and separated steam only pass along the plate.

The raw liquid channel forming gasket 16 comprises an outer frame 16a surrounding the heating steam inlet 11 and drain outlet 14 and surrounding the plate periphery extending from the lower portion of the heating steam inlet 11 to the lower portion of the outlet 13 for concentrate and separated steam so as to form a heating channel 18 for the raw liquid, and an inner frame 16b, substantially U-shaped, which forms a raw liquid preheating channel 19 and by which the raw liquid flowing in through the raw liquid inlet 12 ascends close to the heating steam inlet 11 and makes a U-turn to the heating channels 18 on both sides. Therefore, as shown in FIG. 7, in the raw liquid plate 10b, the raw liquid flowing in through the raw liquid inlet 12 ascends through the raw liquid preheating channel 19, during which time it is preheated and flows down, making a U-turn from the upper end of the raw liquid preheating channel 19 to the heating channels 18 on both sides, and flows down the heating channels 18, during which time it is heated so that the moisture in the raw liquid is separated as it evaporates, the separated steam and concentrate being discharged through the outlet 13; the heating steam and drain only pass along the plate.

Figure 8:
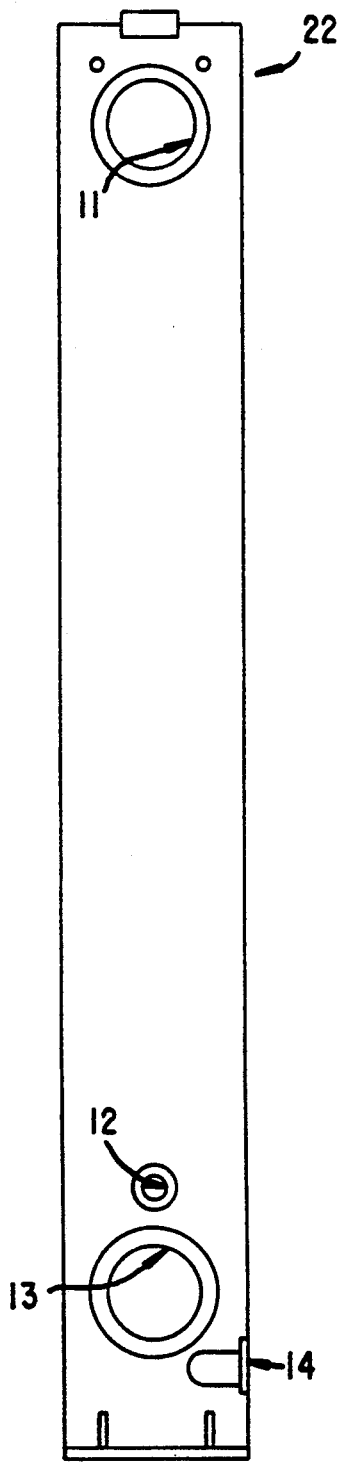
FIGS. 8 and 9 are a front view and a side view, respectively, showing the assembled state thereof.
Figure 9:
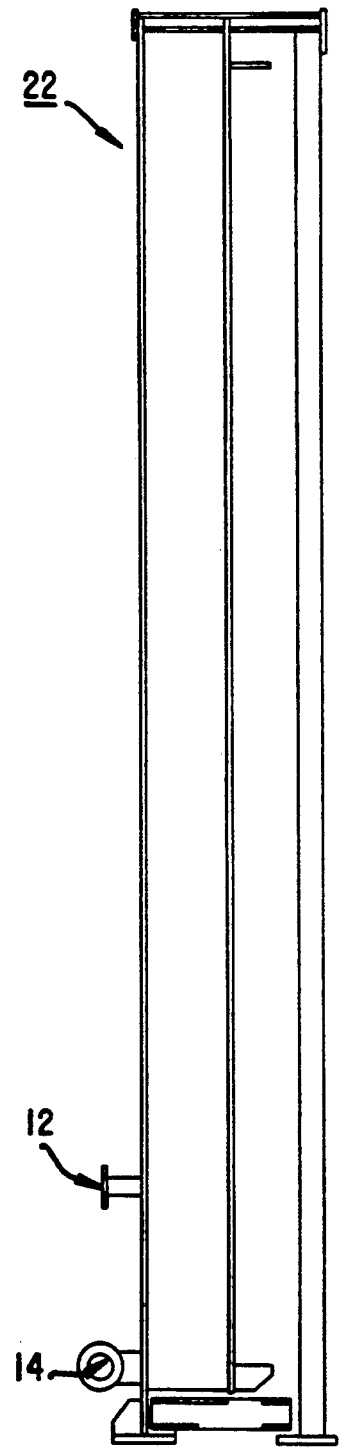

Steam plates 10a and raw liquid plates 10b, as shown in FIG. 7, are paired to form a plurality of pairs, which are positioned between two end plates 20 and 21 and tightened in the laminating direction by bolts or the like, so that a concentrator 22 is assembled, as shown in FIGS. 8 and 9.

The arrangement of the various portions of the raw liquid plate 10b will now be described with reference to FIGS. 1A and 1B and FIGS. 3 through 6.

In the region extending from the upper end of the raw liquid plate 10b to the heating channels 18 on both sides, distributing portions 23 are formed, and pool portions 24 are formed between the distributing portions 23 and the heating channels 18.

The raw liquid inlet 12, as shown in FIG. 1B, is located immediately above the outlet 13 for concentrate and separated steam and on the longitudinal center line of the heat transfer plate 10 and is formed in the vicinity of the lower end of the heat transfer plate 10. In addition, the drain outlets 14 are formed in the lower portion of the outlet 13 for concentrate and separated steam and in both corners of the lower portion of the heat transfer plate 10.

Figure 3:
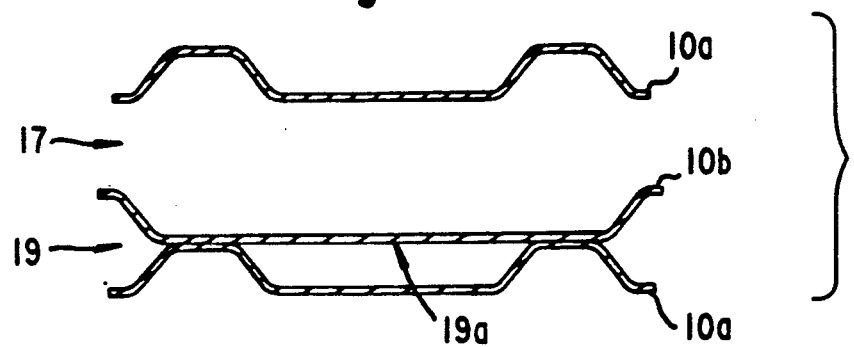
FIG. 3 is a sectional view taken along the line III—III in FIG. 1A.

The raw liquid preheating channel 19, as shown in FIGS. 1A, 1B and 3, is constructed by forming the raw liquid plate 10b with projections 19a at equal or suitable intervals to provide a repetition of wide and narrow regions in the channel cross-section. In addition, in the position of the projection 19a, the raw liquid passes while bypassing both sides; at this time the raw liquid passes along the narrow portion and when it passes over the projection, it comes in the wide portion; in this manner, it passes alternately across the wide and narrow portions, thereby forming a turbulent flow, improving the heat transfer performance in the preheating process.

Figure 4:
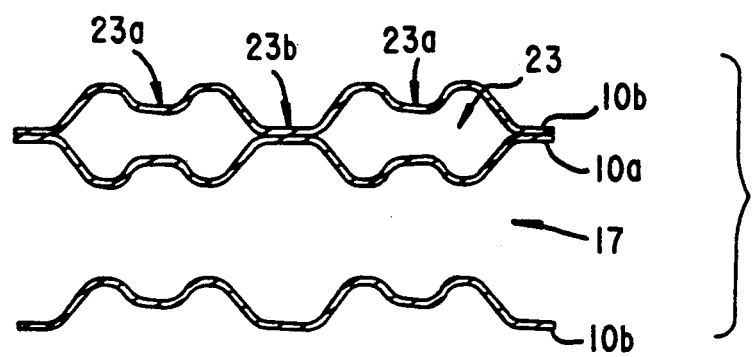
FIG. 4 is a sectional view taken along the line IV—IV in FIG. 1A.

The distributing portions 23, as shown in FIGS. 1A and 4, comprise a plurality of narrow portion forming ridges 23a formed on the heat transfer plate 10 and extending at right angles to the liquid film flow and spaced in the direction of the flow of the raw liquid so that the raw liquid making a U-turn from the upper end of the raw liquid preheating channel to the heating channels 18 on both sides is fed to the heating channels while the liquid film thickness is made uniform, and a number of regularly disposed distributing portions 23b for uniformly distributing the raw liquid between the narrow portion forming ridges 23a and on the heat transfer plate 10 at the distributing portion outlet.

Figure 5:
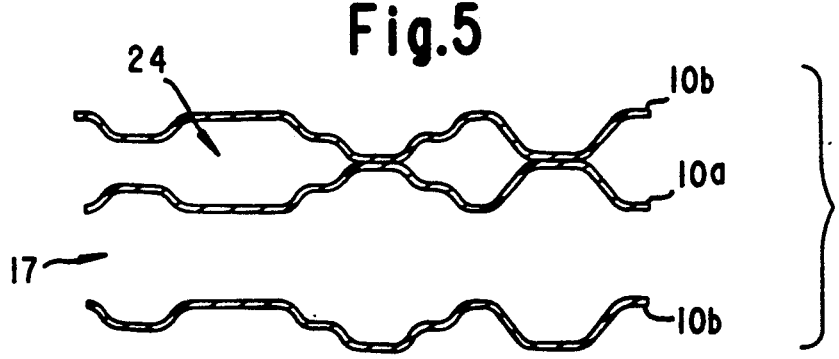
FIG. 5 is a sectional view taken along the line V—V in FIG. 1A.

The pool portion 24, as shown in FIGS. 1A and 5, is a recessed liquid reservoir portion formed in the rearmost regions of the distributing portions 23 and extending at right angles to the direction of downward flow of the raw liquid, whereby the film thickness of the raw liquid fed to the heating channels 18 via the distributing portions 23 is maintained uniform throughout the width of the heating channels 18 at all times.

Figure 6:
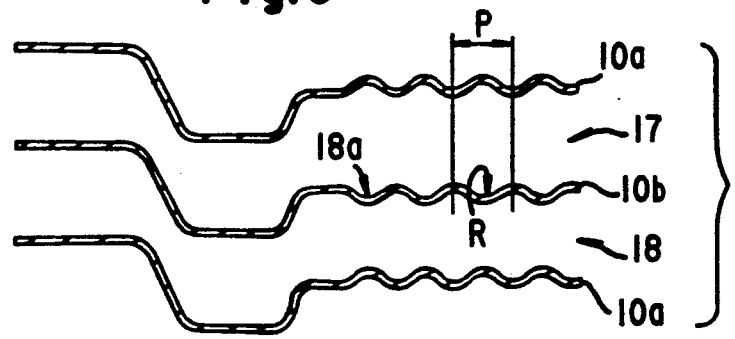
FIG. 6 is a sectional view taken along the line VI—VI in FIG. 1A.

Further, in the heating channels 18, as shown in FIGS. 1A, 1B and 6, a number of longitudinal grooves 18a extending in wave form in the direction of downward flow of the raw liquid are formed at a regular pitch in the direction of the width of the heating channels 18 in the heat transfer plate 10, whereby the direction of downward flow of the raw liquid flowing down is guided and controlled to prevent deviation of the raw liquid flowing down and the drying of the plate surface, thus ensuring uniform evaporation and gradual thinning of the liquid film thickness. Further, the array pitch P and the groove corner curvature R have predetermined values; for example, P=4.5-9.0 mm and R= not more than 3.0 mm, preferably P=6.5 mm and R=1.6 mm. Thereby, in the heating steam channel 17, the condensate drain is collected in the groove bottom of each longitudinal groove 18a by surface tension to expose the raised portion and prevent deterioration of the film heat transfer performance. Similarly, in the raw liquid heating channels 18, the raw liquid is collected in the bottom of each longitudinal groove 18a to reduce the liquid film thickness in the raised portion, thereby improving the film heat transfer performance.

In addition, in FIGS. 1A and 1B, the reference character 18b denotes reinforcing projections suitably disposed in the heating channels 18; 25 denotes a gasket groove for receiving the outer frame 16a therein; 26 denotes a gasket groove for receiving the inner frame 16b therein; 27 denotes distributing and reinforcing projections disposed in the heating steam inlet 11; 28 denotes reinforcing projections disposed in the outlet 13 for concentrate and separated steam; 29 denotes reinforcing projections disposed in the raw liquid preheating channel 19; and 30 denotes reinforcing uneven surface region formed around the entire peripheral edge of the heat transfer plate 10.

In the above embodiment, the pitch P and groove corner curvature R in the longitudinal grooves 18a in the raw liquid heating channels 18 are P=4.0-9.0 mm and R= not more than 3.0 mm. If the pitch P is less than 4.0 mm, the probability of the plate rupturing during press working for pressing the longitudinal grooves 18a to a predetermined depth becomes higher, while if it exceeds 9.0 mm, the probability of dry surface occurring on the side associated with the raw liquid becomes higher and on the side associated with the heating steam the probability of the condensate drain in the raised portion being drawn into the groove bottoms is decreased. Further, if the groove corner curvature R is not more than 3.0 mm, the condensate drain and the like can be arrested within the width of the longitudinal grooves 18a by surface tension; however, if it exceeds 3.0 mm, since the effective range of surface tension is exceeded, the probability of arrest lowers.

As for the pitch P and corner curvature R of said longitudinal groove 18a, optimum design values will be set within said range with respect to their correlation to the respective surface tensions of the raw liquid and heating steam condensate drain.

Figure 10:
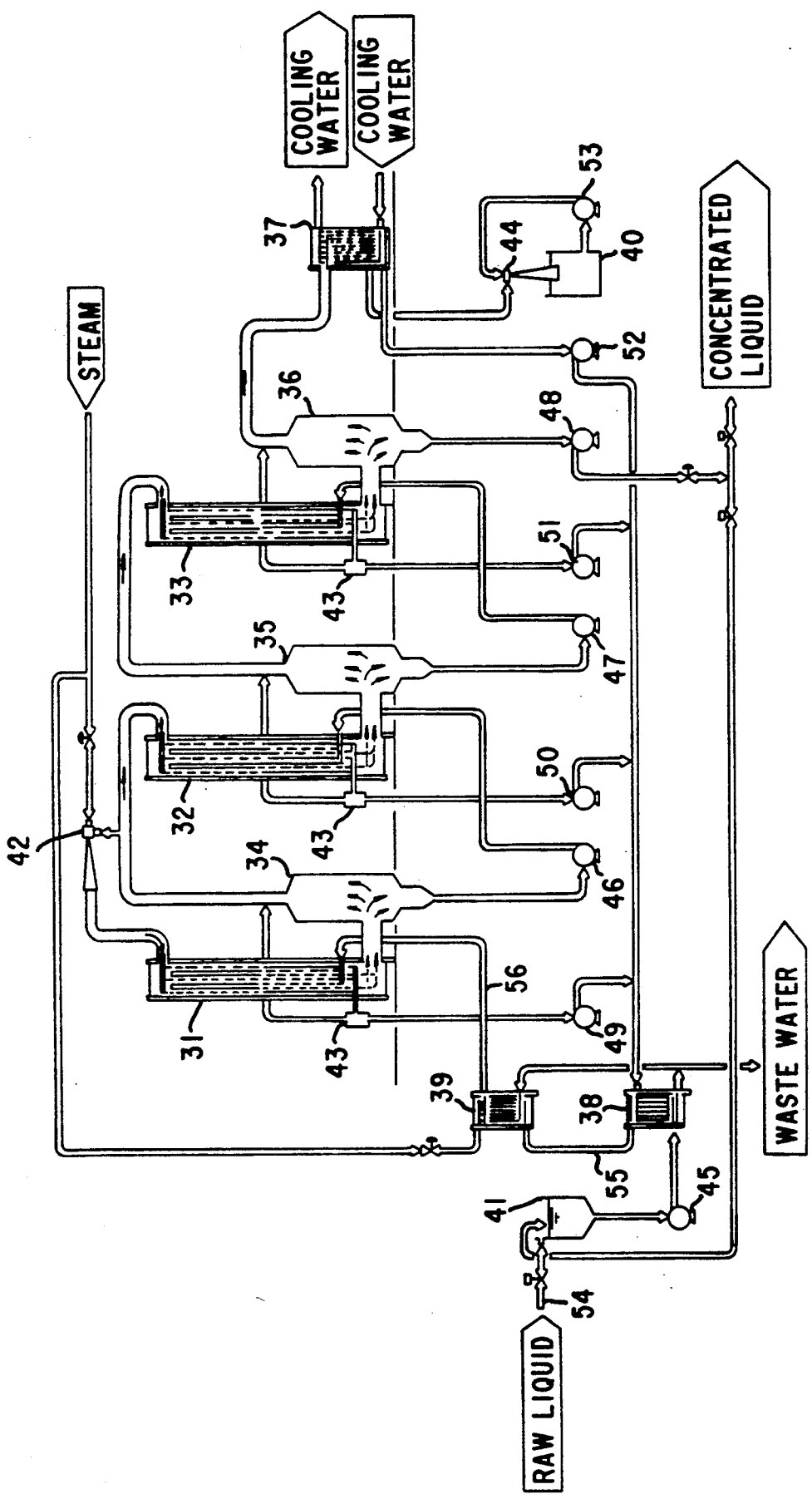
FIG. 10 is a flowsheet showing an example of a concentrator using heat transfer plates according to the present invention.

FIG. 10 is a flowsheet for a concentrating apparatus constructed by using heat transfer plates according to the present invention. The numeral 31 denotes a first concentrator; 32 denotes a second concentrator; 33 denotes a third concentrator; 34 denotes a first separator; 35 denotes a second separator; 36 denotes a third separator; 37 denotes a plate type condenser; 38 and 39 denote plate type preheaters; 40 denotes a water tank; 41 denotes a balance tank; 42 denotes a steam injector; 43 denotes a drain pot; 44 denotes a water injector; 45 denotes a first liquid feed pump; 46 denotes a second liquid feed pump; 47 denotes a third liquid feed pump; 48 denotes an extraction pump; 49 denotes a first drain pump; 50 denotes a second drain pump; 51 denotes a third drain pump; 52 denotes a fourth drain pump; and 53 denotes a vacuum pump.

The raw liquid is fed from a liquid feed pipe 54 at the left-hand end in FIG. 10 to the balance tank 41, wherefrom it is passed by the first liquid feed pump 45 successively through the preheater 38, the liquid feed pipe 55, the preheater 39 and the liquid feed pipe 56 to each raw liquid plate of the first concentrator 31, where it is uniformly distributed in thin film form over the heat transfer surface and flows from the top to the bottom. The steam plate of the first concentrator 31 is fed with heating steam from the steam injector 42, while the condensate drain from the drain pot 43 is extracted by the first drain pump 49 and fed as a preheating medium to the first preheater. Part of the heating steam extracted from the upstream region of the steam injector 42 is utilized as a preheating medium for the second preheater 39.

The raw liquid fed to the first concentrator 31 is concentrated while flowing down in thin film form across the heat transfer surface of each raw liquid plate, the concentrate and the separated steam being separated from each other in the first separator 34. The steam separated in the first separator 34 is fed as a heating medium to the second concentrator 32, while the concentrate is fed to each raw liquid plate of the second concentrator 32 and further concentrated. The concentrate from the second concentrator 32 and the separated steam are separated from each other by the second separator 35. And the steam separated in the second separator 35 is fed as a heating medium to the third concentrator 33; thus, this is a system having multiple utility. On the other hand, the concentrate separated in the second separator 35 is fed by the third liquid feed pump 47 to the third concentrator 33, where it is fed to each raw liquid plate and further concentrated, and the product of predetermined concentration is taken out of the third separator to the outside of the apparatus by the extraction pump 48. In this manner, the raw liquid is concentrated on the basis of one pass flow through the concentrators 31, 32 and 33 without being circulated.

The steam separated in the third separator 36 is condensed in the condenser 37, the drain being fed as a heating medium to the first preheater 38 by the fourth drain pump 52.

The condensate drains produced in the concentrators 31, 32 and 33 are drawn out by the drain pumps 49, 50 and 51, respectively, and fed as heating medium to the first preheater 38.

In addition, the cleaning of the apparatus is effected by stopping the feed of the raw liquid to the balance tank 41 and, instead, feeding cleaning water or cleaning chemical liquid to the balance tank 41, driving the liquid feed pumps 45, 46, 47 and 48 to pass the cleaning agent successively through the first concentrator 31, the first separator 34, the second concentrator 32, the second separator 35, the third concentrator 33, the third separator 36 and the balance tank 41, in the same manner as in the case of the raw liquid, whereby circulatory cleaning using the cleaning water or cleaning chemical liquid is carried out. This is referred to as CIP (Cleaning In Place).

According to the above embodiment apparatus, the following merits are obtained: Since concentration is effected in one pass from the inlet to the outlet of the apparatus, the heat contact time for the raw liquid is short. As a result, there is no deterioration of quality; thus, a concentrate of high quality can be obtained. And because of the short heat contact time and the possibility of low temperature concentration, large amounts of volatile of sweet-smelling components contained in the raw liquid remain, so that when the concentrate is diluted, the added value of the product can be enhanced.

Further, since the hold volume of the entire apparatus is small, the following merits are obtained.
 (a) Concentration is possible even if the amount of raw liquid is small.
 (b) Change of the type of raw liquid is easy.
 (c) During CIP cleaning, the cleaning agent can be saved and the amount of discharge thereof is small.
 (d) The yield of liquid increases.

Because of the feature of non-circulation, the liquid feed pumps used are small-sized and so is the amount of electric power consumption. Further, the employment of the multiple effect evaporation system, steam injectors and preheaters provides a saving of steam consumption and requires a smaller amount of cooling water. Further, even a foamable liquid can be prevented from foaming in the narrow clearance between the plates, ensuring little loss of the liquid due to splash accompaniment or the like and stabilized operation. As for CIP effects, because of the long plate type, even a low flow rate of cleaning agent provides a high speed in the plates, ensuring complete cleaning and satisfactory hygiene. Furthermore, the apparatus has no moving parts and is of the stationary type and compact; thus, the initial cost is low.

Figure 11:
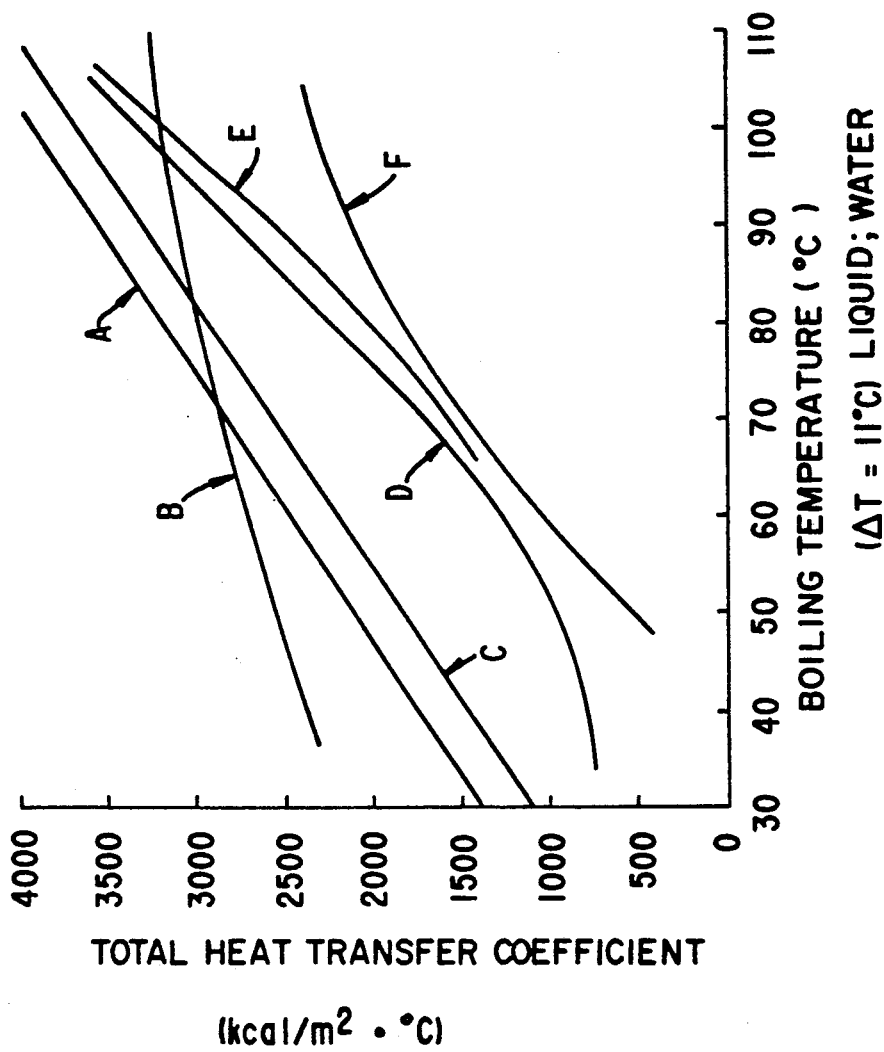
FIG. 11 is a table of comparison of overall coefficient of heat transfer between the present inventive concentrator and various existing concentrators.

FIG. 11 is a table of comparison of overall coefficient of heat transfer between the present inventive concentrator A and other concentrators B through F. It is seen that the present inventive concentrator A has high performance as compared with the other concentrators B through F. Although the force circulation type B exhibits high performance, it cannot be utilized for a one-pass concentrating apparatus which handles highly heat-sensitive liquids.

Examples of data on the quality of concentrated products are described below.

First, concentrated liquids from oranges, pineapples, which are typical concentrated juices, and soybean protein concentrate will be considered. As is clear from Tables 1, 2 and 3, a comparison between raw liquid and concentrate components shows almost no change and it can be said that there is no deterioration of quality.

Table 4 shows the test results of various concentrates obtained by the concentrating apparatus of the invention. In this table, Bx is the unit for saccharose weight percentage.

TABLE 1

Results of Analysis of Unshu Orange Concentrated Juice

| | Measured item | Raw liquid | First utility concentrate | Second utility concentrate | Final concentrate |
|---|---|---|---|---|---|
| 1 | Bx | 11.6 | 20.7 | 36.1 | 60.5 |
| 2 | Acid | 1.05 | 1.05 | 1.05 | 1.05 |
| 3 | PH | 3.36 | 3.36 | 3.36 | 3.36 |
| 4 | V—C (mg %) | 35.28 | 35.28 | 35.27 | 35.26 |
| 5 | A—N (mg %) | 35.44 | 35.37 | 35.23 | 35.02 |
| 6 | L | 51.9 | 50.0 | 49.8 | 49.8 |
| 7 | a | 4.9 | 7.5 | 7.7 | 7.2 |
| 8 | b | 31.5 | 29.8 | 29.8 | 29.6 |
| 9 | Pulp (V/V %) | 5.6 | 4.5 | 4.5 | 4.4 |
| 10 | Degree of brown | 0.114 | 0.144 | 0.144 | 0.144 |

* Analyzed values of acid, et seq. indicate values when adjusted to a Bx value of 11.6.

TABLE 2

Results of Analysis of Pineapple Concentrated Juice

| | Measured item | Raw liquid | Concentrate |
|---|---|---|---|
| 1 | Bx | 6.9 | 50.0 |
| 2 | Acid | 0.99 | 0.95 |
| 3 | PH | 3.32 | 3.35 |
| 4 | V—C (mg %) | 18.62 | 16.04 |
| 5 | Pulp | 0.8 | 1.0 |

* Analyzed values of acid, et seq. indicate values when adjusted to a Bx value of 11.6.

TABLE 3

Results of Analysis of Soybean Protein Concentrate

| | Measured item | Raw liquid | Concentrate (Sample 1) | Concentrate (Sample 2) |
|---|---|---|---|---|
| 1 | Concentration of liquid (Dry Matter) | 4.6 WT % | 32.2 WT % | 48.6 WT % |
| 2 | Degree of turbidity of 5% liquid Color tone of 20% liquid | 1.06 | 1.04 | 1.00 |
| 3 | L value (brightness) | 81.5 | 80.8 | 81.4 |
| 4 | a value (reddish tinge) | 0.8 | 0.7 | 0.7 |
| 5 | b value (yellowish tinge) | 39.1 | 39.5 | 39.9 |
| 6 | ΔE value (degree of transparency) | 36.7 | 37.3 | 37.5 |

TABLE 4

Example of Test Results

| Juices | Concentration of raw liquid | Concentration of concentrate |
|---|---|---|
| Unshu orange | 11 Bx | 57 Bx |
| Pineapple | 10 Bx | 58 Bx |
| Apple | 7 Bx | 43 Bx |
| Sudati (Japanese especially sour orange) | 6 Bx | 61 Bx |
| Prune | 10 Bx | 70 Bx |
| Soybean milks | 5 Bx | 49 Bx |
| Soybean protein Sugar liquids | 41 Bx | 77 Bx |
| Honey Bone extracts | 3 Bx | 35 Bx |
| Poultry bean soup Fish extracts | 1 Bx | 41 Bx |
| Bonito soup Yeasts | 1 Bx | 35 Bx |
| Beer yeast Medicines | 4 Bx | 10 Bx |
| Malt extract | | |

The present inventive apparatus has perfect one-pass performance, as described above, and can be said to be a concentrating apparatus most suitable for concentration of highly heat-sensitive materials. However, in view of its energy saving, maintenanceability, compactness and low cost, the present inventive apparatus is considered to be also effective for concentration of ordinary materials not so sensitive to heat, as compared with other types of concentrating apparatus.

What is claimed is:

1. A thin film downward flow type evaporator, having raw liquid plates and steam plates attached to each other in an alternately laminated sequence, for concentrating a raw liquid by heating steam, characterized in that:

each of said raw liquid plates comprises:
a preheating channel formed on a longitudinal center line of said raw liquid plates for concentrating a raw liquid by using heating steam,
distributing portions formed on both sides of, and extending from an upper end of, said preheating channel to both sides for distributing the flow of raw liquid in a uniform thin film form,
pool portions on both sides of said preheating channel formed immediately below said distributing portions on both sides for causing the liquid film thickness to become uniform over the entire width of a heat transfer surface of said preheat channels, and
heating channels having a mulitplicity of longitudinal grooves, having a pitch of between 4 and 9 mm and a radius of curvature of not more than 3 mm, formed in the lower regions of said pool portions on both sides thereof for causing the raw liquid to flow down in a thin film form, and for guiding and controlling the direction of downward flow of said raw liquid.

2. A thin film downward flow type evaporator as set forth in claim 1, characterized in that each preheating channel has a cross-section which is in the form of a repetition of wide and narrow regions.

3. A thin film downward flow type evaporator as set forth in claim 1, characterized in that the distributing portion thereof comprises a plurality of stepwise-formed narrow portion forming ridges extending at right angle to the direction of liquid film flow and spaced in the direction of the flow of the raw liquid, and a number of distributing projections regularly disposed between said ridges and in outlets from the distributing portions.

4. A thin film downward flow type evaporator as set forth in claim 1, characterized in that the pool portion extends at right angles to the direction of downward flow of the raw liquid and is in the form of a recess where the liquid film thickness is increased.

5. A thin film downward flow type evaporator as set forth in claim 1, characterized in that the ratio between the dimensions of the plates in the direction of fluid flow relative to transverse to said direction is about 9:1.

6. A thin film downward flow type evaporator as set forth in claim 1, characterized in that feeding of the raw liquid to the individual rectangular plates is effected distributively from a common feed channel and the withdrawal of concentrate from the raw liquid plates is effected through a common withdrawal channel.

7. A thin film downward flow type evaporator characterized in that multiple evaporators as claimed in any one of claims 1 through 6 are associated with separators in multi-stage and including means to feed a raw liquid through said multi-stages; a steam injector adapted to feed a heating medium to a first stage evaporator; and means to heat raw liquid, to be fed to the first stage evaporator by interaction with the condensate of the heating medium produced in each stage and by the condensate of the separated steam from the last stage separator.

* * * * *